(12) United States Patent
Ladden et al.

(10) Patent No.: US 7,701,932 B2
(45) Date of Patent: Apr. 20, 2010

(54) DISTRIBUTED AUTOMATICALLY-CONFIGURING SWITCHING SYSTEM

(75) Inventors: Gregory C. Ladden, Vernon Hills, IL (US); Joel L. Gross, Gilbert, AZ (US); Karl E. Miller, Chandler, AZ (US); Stephen S. Sawyer, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 1062 days.

(21) Appl. No.: 10/670,063

(22) Filed: Sep. 23, 2003

(65) Prior Publication Data

US 2004/0258010 A1 Dec. 23, 2004

Related U.S. Application Data

(60) Provisional application No. 60/479,649, filed on Jun. 18, 2003.

(51) Int. Cl.
*H04L 12/50* (2006.01)
(52) U.S. Cl. .................. 370/378; 370/429; 370/458; 370/432; 370/438; 370/442
(58) Field of Classification Search .............. 370/375, 370/378, 398, 395.4, 420, 421, 432, 438, 370/442, 458
See application file for complete search history.

(56) References Cited

U.S. PATENT DOCUMENTS

| | | | | |
|---|---|---|---|---|
| 3,740,483 A | * | 6/1973 | Pedersen | .............. 370/376 |
| 4,292,222 A | * | 9/1981 | Grigo et al. | .............. 524/269 |
| 4,392,222 A | * | 7/1983 | Ando | .............. 370/352 |
| 4,760,570 A | * | 7/1988 | Acampora et al. | .............. 370/417 |
| 5,128,927 A | * | 7/1992 | Killat et al. | .............. 370/416 |
| 5,475,679 A | * | 12/1995 | Munter | .............. 370/395.4 |
| 6,570,872 B1 | | 5/2003 | Beshai et al. | |
| 2002/0126649 A1 | | 9/2002 | Sakurai et al. | |

\* cited by examiner

*Primary Examiner*—Jayanti K Patel
*Assistant Examiner*—Bo Hui A. Zhu
(74) *Attorney, Agent, or Firm*—Steven A. May

(57) ABSTRACT

A distributed switching system comprising a call controller, multiple source modules, and multiple destination modules provides circuit switching functionality without using a centralized circuit switch. When a source module of the multiple source modules receives inbound data, the source module broadcasts the data to each destination module of the multiple destination modules via an inbound time slot of multiple inbound time slots. The call controller selects a destination module of the multiple destination modules to process the data and informs the selected destination module of the inbound time slot. The selected destination module then receives the broadcast via the inbound time slot and processes the broadcast data. The distributed switching system further provides for a transfer of data in an outbound direction by allocating an outbound time slot in which the selected destination module embeds tagged data for receipt and forwarding by the source module.

19 Claims, 5 Drawing Sheets

—PRIOR ART—

US 7,701,932 B2

DISTRIBUTED AUTOMATICALLY-CONFIGURING SWITCHING SYSTEM

REFERENCE(S) TO RELATED APPLICATION(S)

The present application claims priority from provisional application Ser. No. 60/479,649, entitled "DISTRIBUTED AUTOMATICALLY-CONFIGURING SWITCHING SYSTEM," filed Jun. 18, 2003, which is commonly owned and incorporated herein by reference in its entirety.

FIELD OF THE INVENTION

The present invention relates generally to circuit switching systems and in particular to a switching system for time division multiplex (TDM) channels.

BACKGROUND OF THE INVENTION

Circuit switching systems are well known in the art. Such circuit switching systems typically include multiple source modules that receive a signal and route the signal to one of multiple destination modules. Since an intended destination of a signal may vary with each signal received, the circuit switching systems typically include a centralized circuit switch that is interposed between all source modules and all destination modules. For each signal received by a source module, the centralized circuit switch establishes a temporary circuit connecting the source module and a destination module. The source module and destination module are then able to exchange signals via the established circuit. When the communication between the source module and the destination module ends, the centralized circuit switch tears down the established circuit.

For example, FIG. 1 is a block diagram of an exemplary circuit switching system 100 of the prior art. Circuit switching system 100 includes multiple source modules 101-103 and multiple destination modules 131-133. A centralized circuit switch 106 is coupled to each of the multiple source modules 101-103 via respective data links 111-113 and is further coupled to multiple destination modules 131-133 via respective data links 121-123. When a source module, such as source module 102, receives a signal that is intended for a destination module, such as destination module 133, switch controller 104 causes centralized circuit switch 106 to establish a temporary circuit 108 between source module 102 and destination module 133. Source module 102 and destination module 133 are then able to exchange signals via a circuit comprising link 112, circuit 108, and link 123. After the signal has been conveyed to destination module 133, switch controller 104 causes centralized switch 106 to tear down circuit 108.

A problem with a circuit switching system such as circuit switching system 100 is that centralized circuit switch 106 is a single fault zone upon which all interconnect depends. When centralized circuit switch 106 is disabled, the entire switching system 100 is disabled. In order to alleviate such a problem, some circuit switching systems implement redundant circuit switches that back up the centralized circuit switch 106, or sub-divide the centralized circuit switch 106 into multiple centralized circuit switches that each provide centralized circuit switching functionality to one of multiple switching zones. As a result, when one switch goes down the other switching zones will not be affected, and a redundant switch may assume the functions of the disabled switch. However, redundancy is expensive to implement. Furthermore, an increasingly complex centralized switching arrangement requires an increasingly complex centralized process to manage all connections through the centralized switching arrangement.

Therefore, a need exists for a method and an apparatus for providing circuit switching functionality without a need for a centralized circuit switch.

DESCRIPTION OF A PREFERRED EMBODIMENT

Figure 1:
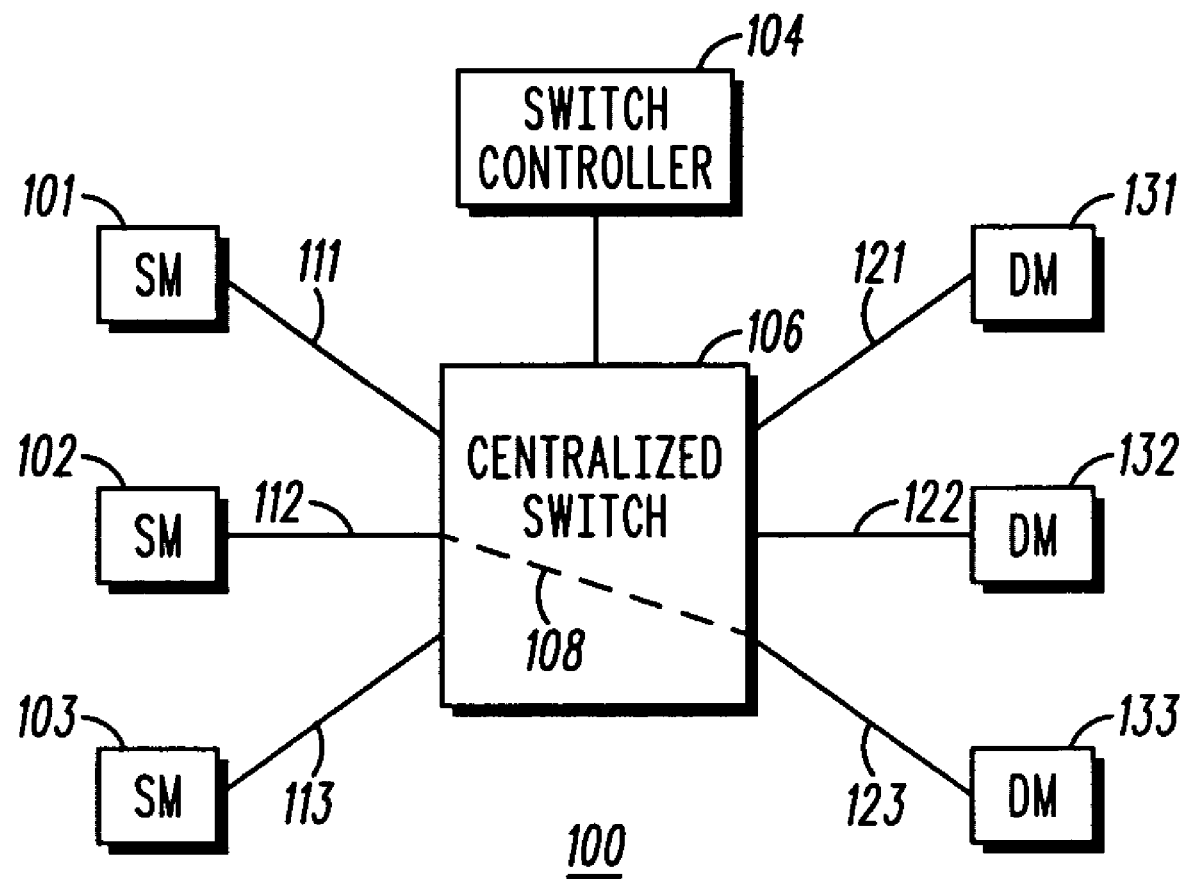
FIG. 1 is a block diagram of a switching system of the prior art.

To address the need for a method and apparatus for providing circuit switching functionality without a need for a centralized circuit switch, a distributed switching system is provided that comprises a call controller, multiple source modules, and multiple destination modules and that provides circuit switching functionality without using a centralized circuit switch. When a source module of the multiple source modules receives inbound data, the source module broadcasts the data to each destination module of the multiple destination modules via an inbound time slot of multiple inbound time slots. The call controller selects a destination module of the multiple destination modules to process the data and informs the selected destination module of the inbound time slot. The selected destination module then receives the broadcast via the inbound time slot and processes the broadcast data. The distributed switching system further provides for a transfer of data in an outbound direction by allocating an outbound time slot in which the selected destination module embeds tagged data for receipt and forwarding by the source module.

Generally, the present invention encompasses a method for providing distributed switching of data among multiple source modules and multiple destination modules. The method includes receiving, by a source module of the multiple source modules, data to be transferred and broadcasting, by the source module, the data to be transferred to each destination module of multiple destination modules via a data link associated with the destination module and an inbound time slot of multiple inbound time slots. The method further includes selecting a destination module of the multiple destination modules to process the data to produce a selected destination module, informing the selected destination module of the inbound time slot of the plurality of inbound time slots, receiving, by the selected destination module, the broadcast data via the inbound time slot, and processing, by the selected destination module, the broadcast data.

Another embodiment of the present invention encompasses a distributed switching system that includes multiple destination modules and multiple source modules. Each source module of the multiple source modules is coupled by a data link of multiple data links to each destination module of the multiple destination modules. Each source module, upon receiving data from a data source, broadcasts the data via a data link of the multiple data links and an associated time slot to each destination module of the multiple destination modules. The distributed switching system further includes a controller coupled to each destination module of the multiple destination modules, wherein the controller, in response to a set up of a call, selects a destination module of the multiple destination modules for a processing of call data and conveys to the selected destination module information concerning a data link and a time slot via which the call data will be broadcast.

Yet another embodiment of the present invention encompasses a distributed switching system that includes a source module that broadcasts data to each destination module of multiple destination modules. The distributed switching system further includes a selected destination module of the multiple destination modules that applies a tag to data to produce tagged data and conveys the tagged data in a time slot of multiple time slots to the source module, wherein the tag indicates that the data included in the time slot is to be forwarded by the source module.

Still another embodiment of the present invention encompasses a method for providing distributed switching of data among multiple source modules and multiple destination modules. The method includes determining a source module that broadcasts to multiple destination modules, selecting a destination module from among the multiple destination modules, and allocating a time slot for a conveyance of data from the selected destination module to the source module. The method further includes tagging the data to produce tagged data, embedding, by the selected destination module, the tagged data in the allocated time slot, and transferring the tagged data to the source module in the allocated time slot.

Figure 2:
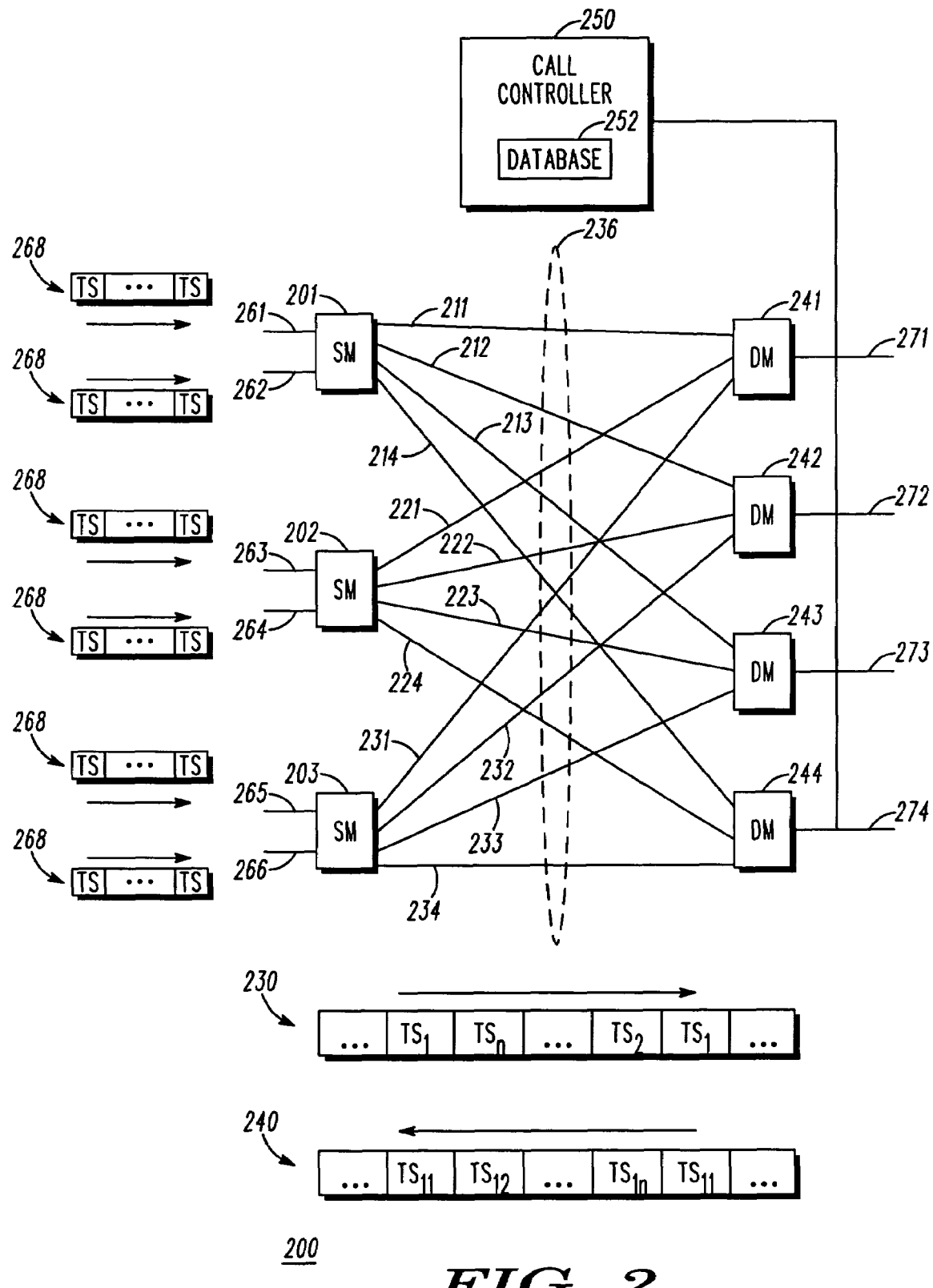
FIG. 2 is a block diagram of a switching system in accordance with an embodiment of the present invention.

The present invention may be more fully described with reference to FIGS. 2-4. FIG. 2 is a block diagram of a circuit switching system 200 in accordance with an embodiment of the present invention. Preferably, switching system 200 is a part of a network of a communication infrastructure and is interposed between other elements of the network. Switching system 200 includes multiple source modules 201-203 (three shown) and multiple destination modules 241-244 (four shown). Each source module 201-203 is coupled to each of the multiple destination modules 241-244 by a data link of multiple data links 211-214, 221-224, 231-234. For example, source module 201 is coupled to each of destination modules 241-244 by a respective data link 211-214, source module 202 is coupled to each of destination modules 241-244 by a respective data link 221-224, and source module 203 is coupled to each of destination modules 241-244 by a respective data link 231-234. Each data link of the multiple data links 211-214, 221-224, 231-234 provides a communications interface between a source module 201-203 and a destination module 241-244 and preferably comprises an Ethernet link. Data links 211-214, 221-224, and 231-234 are collectively referred to herein as a mesh network 236.

Circuit switching system 200 further includes a call controller 250 that is coupled to each destination module 241-244 by a respective link 271-274. Preferably, each link of the multiple links 271-274 comprises an Ethernet link that further functions as a link between a respective destination module 241-244 and a network element external to communication system 200. Call controller 220, preferably a mobility manager (MM), controls whether each destination module 241-244 will process data received via a particular data link 211-214, 221-224, 231-234 and in a particular time slot. Although modules 201-203 are referred to herein as source modules and modules 241-244 are referred to herein as destination modules, one of ordinary skill in the art realizes that the flow of data among modules 201-203 and 241-244 is bi-directional and that each of source modules 201-203 may perform the functions of a destination module and each of destination modules 241-244 may perform the functions of a source module depending on a flow of data between the modules.

Each source module 201-203 includes multiple input/output ports (none shown). For each source module 201-203, at least one input/output port of the multiple input/output ports is coupled to an inbound/outbound link 261-266, preferably an optical link, via which the source module may receive data from and may source data to a first data source, preferably a first network element, such as an upstream network element such as a Digital Access Crossconnect Switch (DACS) or a Mobile Switching Center (MSC), external to system 200. Furthermore, for each source module 201-203, other input/output ports of the multiple input/output ports are each coupled to a data link 211-214, 221-224, 231-234 and, via the data link, to a destination module of the multiple destination modules 241-244.

Each destination module of the multiple destination modules 241-244 also includes multiple input/output ports (not shown) by which the destination module is coupled to a data link 211-214, 221-224, 231-234 and, via the data link, to a source module of the multiple source modules 201-203. Each destination module of the multiple destination modules 241-244 may further include at least one input/output port (not shown) that may be coupled to an inbound/outbound link 271-274 via which the destination module may source data to and may receive data from a second data source, preferably a second network element, such as a downstream network element such as a router, a Selection and Distribution Unit (SDU), or an Access Network (AN), external to system 200. Although links 261-266 are described herein as optical links and links 211-214, 221-224, 231-234, and 271-274 are described herein as Ethernet links, those who are of ordinary skill in the art realize that these links may be any type of link capable of transferring data to and/or from each of source modules 201-203 and destination modules 241-244, and the description of these links as optical links or Ethernet links is not intended to limit the scope of the present invention in any way.

Each of call controller 250, source modules 201-203, and destination modules 241-244 includes a processor, such as one or more microprocessors, microcontrollers, digital signal processors (DSPs), combinations thereof or such other devices known to those having ordinary skill in the art. Each of call controller 250, source modules 201-203, and destination modules 241-244 further includes one or more memory devices associated with the processor, such as random access memory (RAM), dynamic random access memory (DRAM), and/or read only memory (ROM) or equivalents thereof, that store data and programs that may be executed by the processor.

Each source module 201-203 communicates with each destination module 241-244 over a corresponding data link via multiple 'inbound,' that is, source module 201-203-to-destination module 241-244, and multiple 'outbound,' that is, destination module 241-244-to-source module 201-203, communication channels. Each communication channel of the multiple communication channels may be allocated to a user of system 100 and may be used to transmit data associated with the user between a source module and a destination module. Preferably, switching system 200 is a time division multiplex (TDM) communication system in which each communication channel comprises one or more of multiple 'inbound' time slots 230 or one or more of multiple 'outbound' time slots 240 that is repeated periodically. In addition, data is conveyed to each source module 201-203 in one of multiple inbound link time slots 268 via an inbound/outbound link 261-266. The number of different time slots 230, 240, 268 respectively associated with each of data links 211-214, 221-224, 231-234, and inbound/outbound links 261-266, the duration of each time slot, and correspondingly the time slot repeat period for each of the data links and inbound/outbound links is up to a designer of switching system 200 and is not critical to the present invention.

In one embodiment of the present invention, a transcoder embodiment, switching system 200 is included in a transcoder, such as a Voice Processing Unit (VPU) available from Motorola, Inc., of Schaumburg, Ill., that has been modified to perform the functions described herein. In the transcoder embodiment, call controller 250 may reside in the transcoder or may be located elsewhere and coupled to the transcoder. In the transcoder embodiment, each source module 201-203 may comprise an Interface Card (IFC) that includes multiple optical input ports and each inbound/outbound link 261-266 may comprise at least one optical carrier. Each optical input port of the multiple optical input ports terminates at least one optical carrier, such as an OC-3 carrier (Optical Carrier Level 3), via which the IFC receives optical signals comprising voice data. The IFC converts the received optical signals to electrical signals, that is, electrical voice data, and then conveys the electrical signals via one or more inbound time slots 230 and an associated data link to a destination module 241-244. Each IFC further converts electrical signals received from a destination module 241-244 via an outbound time slot 240 to an optical signal and conveys the optical signal outside of switching system 200 via an inbound/outbound link 261-266.

In the transcoder embodiment, each data link of the multiple data links 211-214, 221-224, 231-234 comprises multiple T1 lines. In turn, each T1 link is able to handle at least 24 time slots, which corresponds to 24 voice channels. Each destination module 241-244 comprises a Voice Processing Function (VPF) that includes multiple DSPs and is capable of transcoding voice data received from each of multiple users of the VPF, that is, users of system 200 who are actively engaged in a voice communication session. Each VPF is coupled, at an input port of the multiple input ports of the VPF, to at least one T1 link of the multiple T1 links, and via the at least one T1 link, to an IFC. Each VPF receives voice data from an IFC via an associated T1 link, transcodes the voice data in the processor of the VPF, and then conveys the transcoded data over an Internet Protocol means to the second network element external to switching system 200. However, those who are of ordinary skill in the art realize that switching system 200 need not be limited to a transcoder and may be utilized by any communication system wherein switched communication session may be set up between any one of multiple source modules and any one of multiple destination modules.

Switching system 200 is capable of establishing a switched circuit between any one of the multiple source modules 201-203 and any one of the multiple destination modules 241-244 without utilizing a centralized circuit switch. As a result, a communication session may be established whereby 'inbound' data may be transferred by any source module 201-203 to any destination module 241-244, and 'outbound' data may be transferred by any destination module 241-244 to any source module 201-203, without the need for an intervening circuit switch.

Figure 3A:
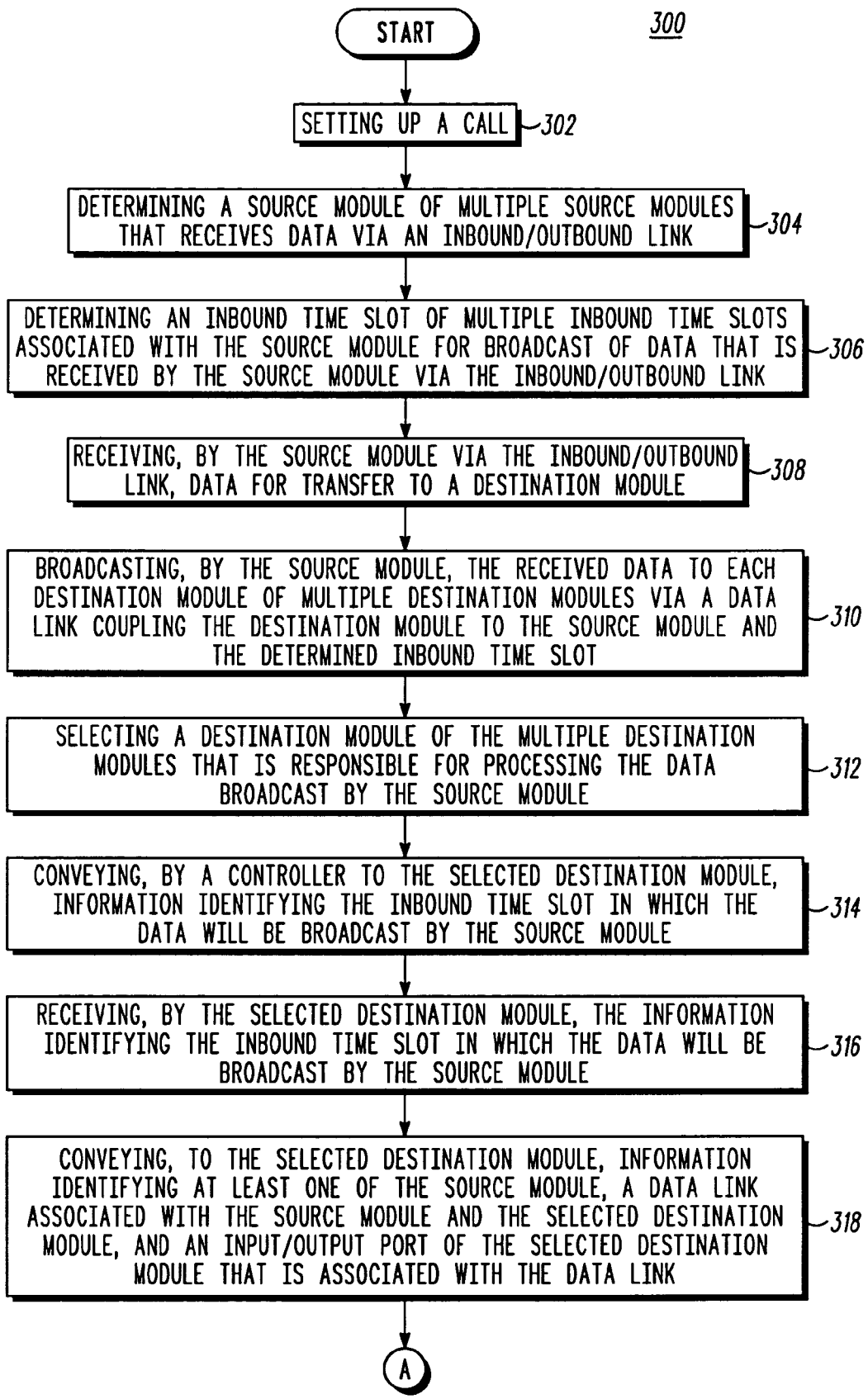
FIG. 3A is a logic flow diagram of an operation of the switching system of FIG. 2 in accordance with an embodiment of the present invention.
Figure 3B:
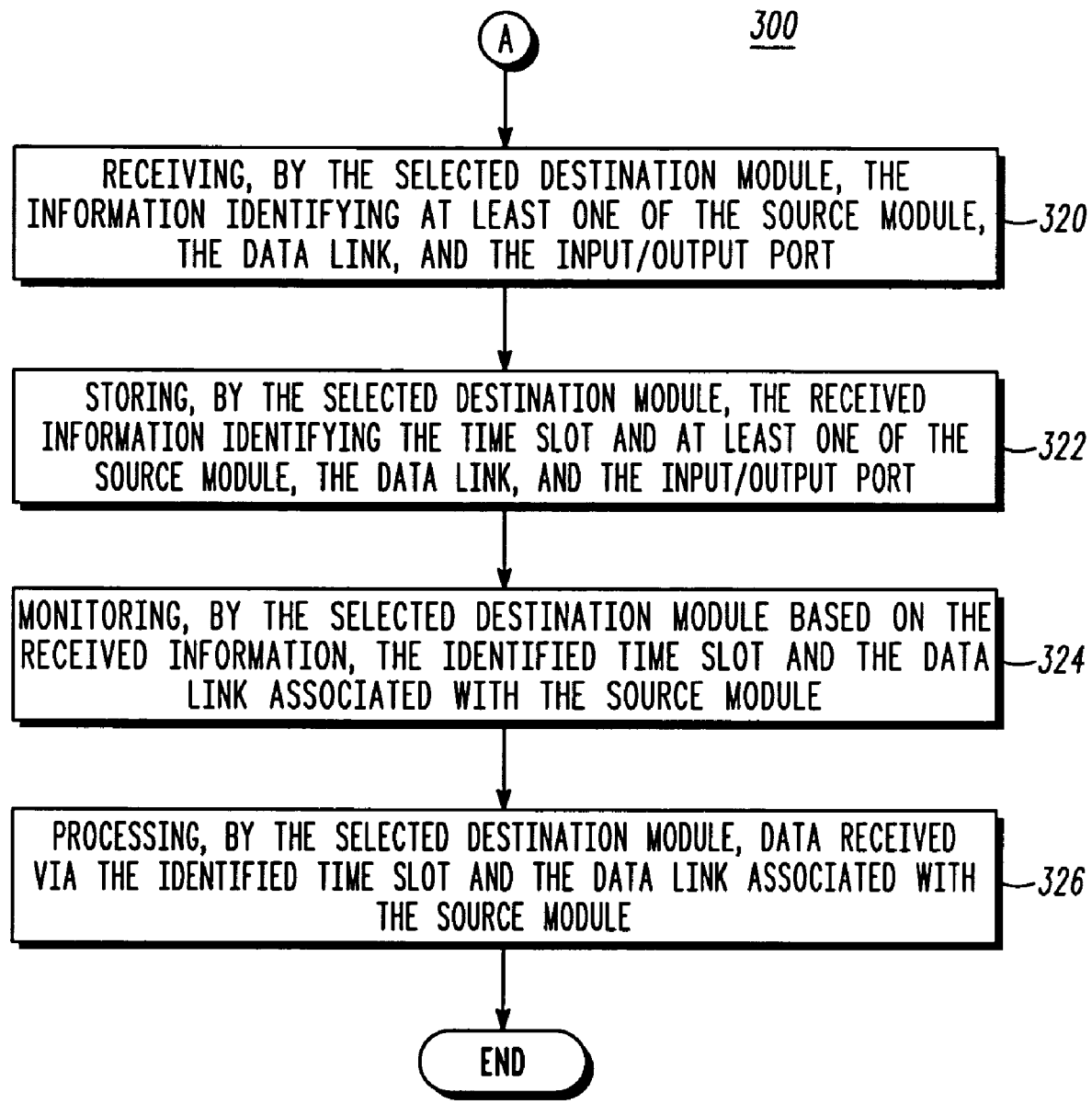
FIG. 3B is a continuation of the logic flow diagram of FIG. 3A illustrating an operation of the switching system of FIG. 2 in accordance with an embodiment of the present invention.
Figure 4:
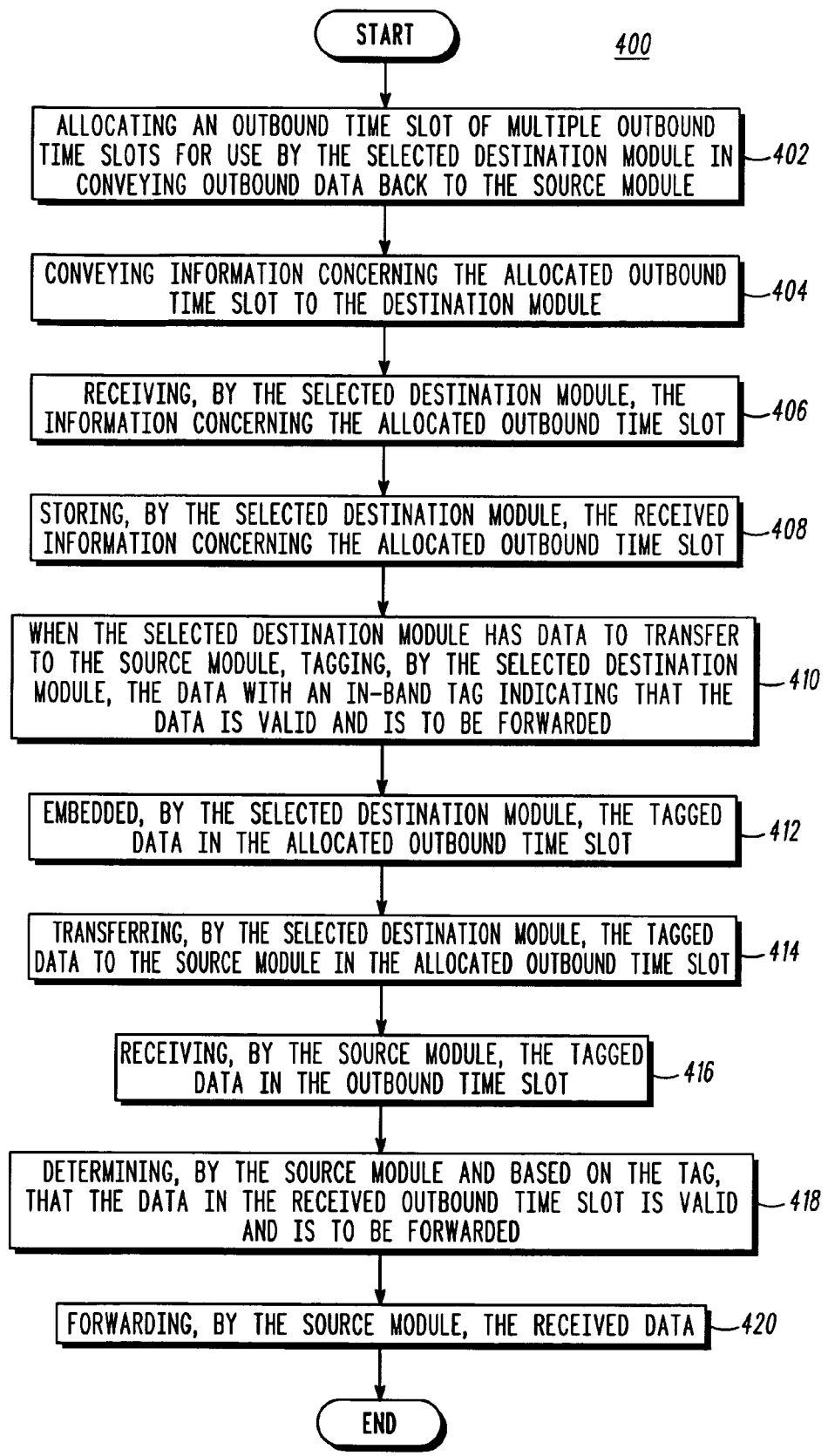
FIG. 4 is a logic flow diagram of an operation of the switching system of FIG. 2 in accordance with another embodiment of the present invention.

Referring now to FIG. 3, a logic flow diagram 300 is provided that illustrates an operation of switching system 200 in accordance with an embodiment of the present invention. Logic flow diagram 300 begins when a voice call is set up (302) and a communication session is established by call controller 250 in accordance with well-known call set-up techniques. When the call is set up, call controller 250 allocates an inbound/outbound link 261-266, such as inbound/outbound link 261, to the call. Call controller 250 further allocates an inbound link time slot of the multiple inbound link time slots 268 associated with the allocated inbound/outbound link 261 to the call. Based on the allocated inbound/outbound link 261, call controller 250 determines (304) a source module, that is, source module 201, of the multiple source modules 201-203 that is a recipient of data transferred over the allocated inbound/outbound link 261. Data is then transferred to the source module of the multiple source modules 201-203, that is, source module 201, associated with the allocated inbound/outbound link 261 via the allocated inbound/outbound link and the allocated inbound link time slot.

Call controller 250 further determines (306) an inbound time slot of multiple inbound time slots 230, such as $TS_1$, associated with source module for broadcast, by the source module, of data received via inbound/outbound link 261. Preferably, call controller 250 includes a database 252 that includes a mapping of each of the multiple inbound link time slots 268 associated with each of inbound/outbound links 261-266 to an inbound time slot of the multiple inbound time slots 230 associated with each source module 201-203. By reference to database 252, call controller 250 is able to determine, for data received by source module 201 via an inbound link time slot 268 and an allocated inbound/outbound link 261, an inbound time slot of the multiple inbound time slots 230, such as time slot $TS_1$, that is associated with each data link of the multiple data links 211-214 and in which the source module will broadcast the received data over each of the multiple data links 211-214 coupling the source module to a destination module.

Upon receiving (308) data via inbound/outbound link 261 for transfer to a destination module, source module 201 broadcasts (310) the received data to each of the multiple destination modules 241-244 via a respective data link 211-214 and the allocated inbound time slot, that is, inbound time slot $TS_1$.

Call controller 250 further selects (312) a destination module, such as destination module 242, of the multiple destination modules 241-244 that is responsible for processing of the data broadcast by source module 201. In response to selecting a destination module of the multiple destination modules 241-244, that is, destination module 242, call controller 250 conveys (314) to the selected destination module, and the selected destination module receives (316) from the call controller, information identifying the inbound time slot, that is, inbound time slot $TS_1$, of the multiple inbound time slots 230, in which the data will be broadcast. Call controller 250 also conveys (318) to the destination module, and the destination module receives (320) from the call controller, information identifying at least one of a source module 201 that will be transferring the data, a data link, such as data link 212, associated with the source module 201 transferring the data and with the selected destination module, and an input/output port of the selected destination module via which the data will be received. Destination module 242 stores (322) the received time slot information and the received information identifying at least one of a source module, a data link, and an input/output port in the destination module's memory devices.

Although the operation of switching system 200 is described herein with reference to an operation of source module 201 and a destination module 242, the procedures described herein apply equally to an operation of any of the multiple source modules 201-203 and the multiple destination modules 241-244. The use of source module 201 and destination module 242 to describe the operation of switching system 300 is merely meant to assist the reader in understanding the principles of the present invention and is not intended to limit the invention in any way.

Based on the information received from call controller 250, the selected destination module, that is, destination module 242, then monitors (324) the identified inbound time slot $TS_1$ of the multiple inbound time slots 230 and the data link 212 associated with source module 201. Upon receiving data via the identified inbound time slot $TS_1$ and the identified source module, data link, and/or the identified input/output port, the destination module processes (326) the data and continues processing data subsequently received via the identified time slot and the identified source module, data link, and/or the identified input/output port until subsequently instructed to stop. Logic flow 300 then ends. For example, call controller 220 may instruct the selected destination module 242 to stop processing the data upon termination of the call. However, in other embodiments of the present invention, the selected destination module 242 may process a predetermined number of time slots or process time slots for a predetermined period of time before stopping. Other destination modules of the multiple destination modules 241-244 that are not notified by call controller 250 of inbound time slot $TS_1$ and source module 201, and/or the data link associated with the source module, and/or the destination module input/output port associated with the source module, do not process the data broadcast in the inbound time slot. As a result, only selected destination module 242 will process the data broadcast by source module 201.

In one embodiment of the present invention, the selected destination module may only be notified by call controller 250 of an inbound time slot and need not be notified by the call controller of a source module sourcing the data or an incoming route of the data, such as a data link 212 or an input/output port via which the data is transferred. In such an embodiment, when the source module receives data via an inbound/outbound link 261-266, such as inbound/outbound link 261, the source module tags the data with an indicator that the data is valid and is to be processed. For example, when either a source module 201-203 or a destination module 241-244 encodes data for transfer over a data link 211-214, 221-224, 231-234, the encoding process produces excess, unused bits that are transferred over the link and in which control information or other information may be embedded. The source module may then tag the received data by embedding an indicator in an excess, or unused bit, that indicates that the data in the time slot is valid and is to be processed. The tagged data is then broadcast by the source module in the allocated inbound time slot. When the selected destination module receives the tagged data from source module 201-203 via an inbound time slot identified to the selected destination module by call controller 250, the destination module processes the data to determine whether the data is tagged. Upon detecting the tag, the selected destination module determines that the data is valid and processes the associated data.

In another embodiment of the present invention, each of call controller 250 and destination modules 241-244 may maintain, in the memory devices of the call controller and the module, an identifier associated with each source module of the multiple source modules 201-203. Call controller 250 may then identify data to be processed by conveying, to the selected destination module, the identifier associated with the source module that will be sourcing the data. When source module 201 receives data for transfer to selected destination module 242, the source module attaches a header including a source module identifier to the data and broadcasts the data and header in the allocated inbound time slot. When selected destination module 242 receives the broadcast in the allocated time slot, the selected destination module 242 parses the received data and header and, upon detecting the source module identifier identified by call controller 250, processes the received data.

In still another embodiment of the present invention, each destination module may further maintain in the destination module memory devices, in association with each source module identifier, an input port identifier associated with an input port of the destination module. Call controller 250 may then identify data to be processed by conveying, to the selected destination module, the identifier associated with the source module that will be sourcing the data. Based on the source module identifier and by reference to the destination module's memory devices, the destination module may determine the input port to monitor and process data received at the determined input/output port and in the identified time slot.

In yet another embodiment of the present invention, each input port of each destination module may have an identifier associated with the input port. Call controller 250 may maintain, in the call controller's memory devices and in association with each destination module, a table of destination module input/output port identifiers and, in association with each such input/output port, an identifier of a source module 201-203. Such a table may be established when switching system 200 is set up. Based on the source module that will be transferring data, call controller 250, specifically the processor of the call controller by reference to the call controller's memory devices, may determine the destination module input port via which the data will be received. Call controller 220 may then inform the destination module of the destination module input/output port to monitor by conveying the input port identifier to the destination module.

By allocating a time slot for a broadcast of data from a source module to multiple destination modules and only informing a selected destination module of the multiple destination modules of the allocated time slot, a distributed switching system is provided that is capable of automatically self-configuring. No centralized switch is required for an exchange of data among a source module and a destination module, as the source module broadcasts data to each of multiple destination modules and only a destination module of the multiple destination modules selected by a call controller processes the broadcast data.

In addition to the inbound transfer of data described above, switching system 200 further provides for a transfer of data in an outbound direction when required by a communication session. Referring now to FIG. 4, a logic flow diagram 400 illustrates an operation of switching system 200 in transferring data in an outbound direction in accordance with another embodiment of the present invention. Logic flow diagram 400 begins when, in order to facilitate a transfer of data in an outbound direction, call controller 250 allocates (402) an outbound time slot of multiple outbound time slots 240, such as outbound time slot $TS_{11}$, for use by destination module 242 in conveying outbound data back to source module 201 via data link 212. By allocating the outbound time slot, that is, outbound time slot $TS_{11}$, to destination module 242, call controller 250 reserves, exclusively for destination module 242, the use of outbound time slot $TS_{11}$ to convey outbound data to source module 201.

Call controller 250 conveys (404) information concerning the allocated outbound time slot, that is, outbound time slot $TS_{11}$, to destination module 242. Upon receiving (406) the information concerning the allocated outbound time slot, destination module 242 then stores (408) the information concerning the allocated outbound time slot in the destination module's memory devices. When destination module 242 has data for transfer to source module 201, such as data received by the destination module via an input/outbound link 272 coupled to the destination module, or data generated by an application running on the processor of the destination module, the destination module tags (410) the data with an in-band tag to produce tagged data, the in-band tag indicating that this is valid data that is to be forwarded. Destination module 242 embeds (412) the tagged data in the allocated outbound time slot along and transfers (414) the tagged data to source module 201 in the allocated outbound time slot, that is, time slot $TS_{11}$. For example, as noted above, when either a source module 201-203 or a destination module 241-244 encodes data for transfer over a data link 211-214, 221-224, 231-234, the encoding process produces excess, unused bits that are transferred over the link and in which control information or other information may be embedded. Destination module 242 may then tag data by embedding an indicator in the one or more excess, or unused, bits that indicates that the data in the time slot is to be processed and forwarded along an inbound/outbound link 261-266.

When the source module 201 receives (416) the tagged data, the source module determines (418), based on the tag, that the data in the received outbound time slot is valid data that is to be forwarded and forwards (420) the data in the outbound time slot outside of switching system 200, for example, to the first network element, via an inbound/outbound link 261 coupled to the source module, that is, inbound/outbound link 261. When the call terminates, call controller 250 deallocates, or un-reserves, the outbound time slot and so informs the destination module. Logic flow 400 then ends.

By allocating an outbound time slot for a conveyance of outbound data from a destination module, that is, destination module 242, to a source module, that is, source module 201, and tagging data embedded in the allocated outbound time slot, destination module 242 is able to convey outbound data to source module 201 for forwarding by the source module without a need for a centralized switch. Accordingly, switching system 200 provides a distributed switching system whereby any one of multiple source modules 201-203 may exchange signals with any one of multiple destination modules 241-244 without a need for a centralized switch. The distributed switching system is automatically self-configuring as a call controller 250 determines, for each communication session, a source module for the session and further selects a destination module that processes inbound data transferred by the source module and that is able to transfer outbound data back to the source module.

Although the operation of switching system 200 is described herein with reference to an operation of source module 201 and destination module 242, the procedures described herein apply equally to an operation of any of multiple source modules 201-203 and multiple destination modules 241-244. The use of source module 201 to describe the operation of switching system 300 is merely meant to assist the reader in understanding the principles of the present invention and is not intended to limit the invention in any way.

Furthermore, while the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing distributed switching of data among a plurality of source modules and a plurality of destination modules, the method comprising:
   receiving, by a source module of the plurality of source modules, data to be transferred;
   broadcasting, by the source module, the data to each destination module of a plurality of destination modules via a data link associated with each destination module and an inbound time slot of a plurality of inbound time slots;
   receiving, by each destination module of the plurality of destination modules, the data;
   selecting, by a controller uncoupled from the data link, a destination module of the plurality of destination modules to process the data, wherein the destination module is selected without employing the data link;
   identifying, by the controller to the selected destination module, the inbound time slot of the plurality of inbound time slots; and
   processing, by only the selected destination module, the broadcast data based on the identified time slot.

2. The method of claim 1, further comprising:
   determining a source module of the plurality of source modules that receives the data; and
   determining an inbound time slot of a plurality of inbound time slots in which the source module will broadcast the data.

3. The method of claim 2, wherein determining an inbound time slot comprises determining an inbound time slot of a plurality of inbound time slots in which the source module will broadcast the data based on a time slot in which the source module receives the data.

4. The method of claim 2, wherein the source module and the inbound time slot are determined in response to a set up of a call.

5. The method of claim 1, wherein the plurality of source modules and the plurality of destination modules are implemented in a transcoder.

6. The method of claim 5, wherein each source module of the plurality of source modules comprises an interface board, each destination module of the plurality of destination modules comprises a voice processing function, and the data comprises voice data.

7. The method of claim 1, further comprising:

allocating an outbound time slot for use in transferring outbound data from the selected destination module to the source module;

tagging the data to produce tagged data;

embedding, by the selected destination module, the tagged data in the allocated outbound time slot; and transferring the tagged data to the source module in the allocated outbound time slot.

8. The method of claim 7, further comprising:

receiving the tagged data by the source module;

determining, by the source module and based on the tag, that the data in the allocated outbound time slot is to be forwarded;

forwarding the data by the source module.

9. A distributed switching system comprising:

a plurality of source modules, wherein each source module of the plurality of source modules is coupled by a data link of a plurality of data links to each destination module of a plurality of destination modules and wherein each source module, upon receiving data from a data source, broadcasts the data via a data link of the plurality of data links and an associated time slot to each destination module of the plurality of destination modules;

a controller, uncoupled from the data link, coupled to each destination module of the plurality of destination modules, wherein the controller, in response to a set up of a call, selects a destination module of the plurality of destination modules for a processing of call data and conveys to the selected destination module information concerning a data link and a time slot via which the call data will be broadcast; and the plurality of destination modules, wherein each destination module of the plurality of destination modules receives the broadcast data and wherein only the selected destination module of the plurality of destination modules processes the data, based on the information concerning the time slot via which the call data will be broadcast.

10. The switching system of claim 9, wherein the selected destination module processes the broadcast data based on the time slot and data link information provided by the call controller.

11. The switching system of claim 9, wherein the call controller further determines a source module of the plurality of source modules that receives data coming into the switching system and determines a time slot of a plurality of time slots in which the source module will broadcast the received data.

12. The switching system of claim 11, wherein the call controller determines a time slot of a plurality of time slots in which the source module will broadcast the received data based on a time slot in which the source module receives the data.

13. The switching system of claim 9, wherein the switching system is implemented in a transcoder.

14. The switching system of claim 13, wherein each source module of the plurality of source modules comprises an interface board and each destination module of the plurality of destination modules comprises a voice processing function.

15. The switching system of claim 9, wherein the call controller further determines the data link and informs the destination module of the designated data link.

16. The switching system of claim 15, wherein the call controller determines the data link and further determines the time slot in response to the set up of a call.

17. The switching system of claim 9, wherein the call controller further allocates at least one an outbound time slot, for use in transferring outbound data from the selected destination module to the source module.

18. The switching system of claim 17, wherein the selected destination module further tags data to produce tagged data, embeds the tagged data in the allocated outbound time slot, and transfers the tagged data to the source module in the allocated outbound time slot.

19. The switching system of claim 18, wherein the source module further receives the tagged data, determines, based on the tag, that the data in the allocated outbound time slot is to be forwarded, and forwards the data in the allocated outbound time slot.

* * * * *